United States Patent [19]
Smith et al.

[11] Patent Number: 5,992,744
[45] Date of Patent: Nov. 30, 1999

[54] OPTICAL READER HAVING MULTIPLE SCANNING ASSEMBLIES WITH SIMULTANEOUSLY DECODED OUTPUTS

[75] Inventors: George S. Smith, Manlius; Michael A. Ehrhart, Liverpool, both of N.Y.

[73] Assignee: Welch Allyn, Inc., Skaneateles Falls, N.Y.

[21] Appl. No.: 08/802,536

[22] Filed: Feb. 18, 1997

[51] Int. Cl.⁶ .................................................. G06K 7/10
[52] U.S. Cl. .......................... 235/462.11; 235/462.07; 235/462.24
[58] Field of Search ................ 235/462.01, 462.07, 235/462.09, 462.1, 462.11, 462.24, 472.01, 470

[56] References Cited

U.S. PATENT DOCUMENTS

| | | | |
|---|---|---|---|
| 3,964,947 | 6/1976 | Mort, Jr. et al. | 156/64 |
| 4,542,528 | 9/1985 | Sanner et al. | 235/440 |
| 5,117,098 | 5/1992 | Swartz | 235/472 |
| 5,124,537 | 6/1992 | Chandler et al. | 235/462.11 |
| 5,168,149 | 12/1992 | Dvorkis et al. | 235/472 |
| 5,223,701 | 6/1993 | Batterman et al. | 235/494 |
| 5,235,167 | 8/1993 | Dvorkis | 235/462 |
| 5,241,166 | 8/1993 | Chandler | 235/494 |
| 5,291,009 | 3/1994 | Roustaei | 235/472 |
| 5,349,172 | 9/1994 | Roustaei | 235/472 |
| 5,352,922 | 10/1994 | Barkan et al. | 257/459 |
| 5,354,977 | 10/1994 | Roustaei | 235/472 |
| 5,484,994 | 1/1996 | Roustaei | 235/462 |
| 5,504,316 | 4/1996 | Bridegelall et al. | 235/462 |
| 5,504,367 | 4/1996 | Arackellian et al. | 235/472 |
| 5,521,366 | 5/1996 | Wang et al. | 235/454 |
| 5,532,467 | 7/1996 | Roustaei | 235/472 |
| 5,541,419 | 7/1996 | Arackellian | 235/470 |
| 5,550,366 | 8/1996 | Roustaei | 235/462 |
| 5,572,006 | 11/1996 | Wang et al. | 235/454 |
| 5,637,856 | 6/1997 | Bridgelall et al. | 235/472 |
| 5,672,858 | 9/1997 | Li et al. | 235/462.11 |
| 5,691,528 | 11/1997 | Wyatt et al. | 235/462 |
| 5,693,930 | 12/1997 | Katoh et al. | 235/467 |
| 5,744,815 | 4/1998 | Gurevich et al. | 235/462 |
| 5,763,864 | 6/1998 | O'Hagan et al. | 235/472 |

OTHER PUBLICATIONS

SE 1000 Family Integration Manual, Rev. D, Nov. 1994, pp. 2, 5, and 32.

*Primary Examiner*—Donald Hajec
*Assistant Examiner*—Daniel St. Cyr
*Attorney, Agent, or Firm*—Wall Marjama Bilinski & Burr

[57] ABSTRACT

An apparatus and method for reading optically encoded symbols which are of types which are not known in advance and which have significantly different illumination and imaging requirements. The apparatus and method use at least two optical scanning assemblies which have different illumination systems, different spatial resolutions and at least partially overlapping depth of field. These optical scanning systems are so located with respect to one another that a target symbol may be read by both scanning assemblies without the apparatus being manually reconfigured or moved during the reading process.

10 Claims, 7 Drawing Sheets

OPTICAL READER HAVING MULTIPLE SCANNING ASSEMBLIES WITH SIMULTANEOUSLY DECODED OUTPUTS

BACKGROUND OF THE INVENTION

The present invention relates to a method and apparatus for reading optically encoded symbols, and is directed more particularly to a method and apparatus for reading optically encoded symbols that uses multiple optical scanning assemblies having differing spatial resolutions and at least partially overlapping depths of field.

Optical readers, particularly bar code readers, are being used in an ever widening range of applications. In those applications where the amount of data is relatively small, the data is conveniently encoded in a one-dimensional (1D) bar code symbol. The reading of data from such symbols requires an optical reader with a spatial resolution that is relatively high in only a single dimension.

For 1D symbols which are relatively large or have relatively low data densities, readers which use 1D illumination sources and photosensitive detectors such as 1D or linear image sensors, are often used. Example of such 1D readers are described U.S. Pat. Nos. 5,187,355 (Chandler) and 5,288,984 (Ito et al). For 1D symbols which are relatively small or have relatively high data densities, on the other hand, readers which use scanning lasers and photosensitive detectors such as photodiodes are often used. Examples of such readers are described in U.S. Pat. Nos. 4,387,297 (Swartz et al) and 4,409,410 (Shepard et al).

In those applications where the amount of data is relatively large, the data is preferably encoded in a two-dimensional (2D) bar code symbol. The reading of data from such symbols requires an optical reader which has approximately equal spatial resolutions in two mutually perpendicular directions.

For 2D symbols which are relatively large or have relatively low data densities, readers which use 2D or flood illumination sources with photosensitive detectors such as 2D or matrix image sensors are often used. Examples of such 2D readers are described in U.S. Pat. Nos. 4,488,679 (Bockholt) and 5,531,366 (Wang et al). For 2D symbols which are relatively small or have relatively high data densities, on the other hand, readers which use rasterized scanning lasers with suitable photosensitive detectors are often used. Examples of such 2D readers are described in U.S. Pat. No. 5,545,886 and in International Patent Publication no. WO93/18478 (Durbin et al).

The problem with readers of the above-mentioned types is that, due to the ever widening range of products to which optically readable symbols are being applied, users frequently encounter situations in which their readers are unable to successfully decode symbols of a variety of types, sizes and densities. Significantly, this inability is more often the result of a mismatch between the size or density of the symbol and the resolution and depth of field capability of the reader, than it is the result of an inability of the reader to autodiscriminate and decode symbols of different types.

In view of the foregoing, it will be seen that a need exists for an optical reader that is able to read and decode bar code symbols having a wide range of resolution requirements, and for a method of operating such reader that eliminates the need to manually reconfigure the reader as symbols having different sizes and densities are encountered during use.

SUMMARY OF THE INVENTION

In accordance with the invention there is provided an improved apparatus and method for quickly and conveniently reading optically encoded symbols which are of types that are not known in advance and which have significantly different illumination and imaging requirements.

In its apparatus aspect, reader of the present invention includes at least two optical scanning assemblies which have different illumination systems, different spatial resolutions and at least partially overlapping depths of field, and which are so mounted with respect to one another that a symbol of unknown size, density, etc. can be illuminated, resolved and imaged by both scanning assemblies without the reader being manually reconfigured or moved during the reading process.

In the preferred embodiment, the two scanning assemblies include a first flood illuminated scanning assembly which is adapted to perform a two dimensional scan at relatively low resolution, and a second laser illuminated scanning assembly which is adapted to perform a one dimensional scan at relatively high resolution. Often, these scanning assemblies will operate sequentially, i.e., with a scan being initiated by one scanning assembly after the completion of a scan by the other scanning assembly. Depending upon the application, scanning by one of these scanning assemblies may be skipped if the operation of the other scanning assembly results in a successful decode.

The reader of the present invention also includes one or more decoding assemblies for decoding the sets of image data produced by the scanning assemblies. These decoding assemblies may each comprise a decoding processor that is programmed to execute a decoding algorithm that is appropriate for use in decoding image data produced by a respective scanning assembly. Often a single decoding processor may be used with both scanning assemblies, serving as the decoding processor for image data stored in a first memory space by one scanning assembly, and as the decoding processor for image data stored in a second memory space by the other scanning assembly.

In embodiments of the invention, herein referred to as "series" or "sequential", these decoding algorithms are executed one after the other, with the execution of the later executing decoding algorithm being optionally skipped if the earlier executing decoding algorithm results in a successful decode. In other embodiments of the invention, herein referred to as "parallel" or "simultaneous", both decoding algorithms are executed at substantially the same time as, for example, on a time division multiplexed basis. With both embodiments, the outputting of valid data may be conditioned upon matching successful decodes by both decoding assemblies.

In the preferred embodiment, the decoding assembly or assemblies use different respective autodiscrimination algorithms. In particular, image data scanned by the laser illuminated scanning assembly is preferably decoded by means of a 1D autodiscrimination algorithm, while image data scanned by the flood illuminated scanning assembly is preferably decoded by means of a 1D/2D autodiscrimination algorithm. The probability of a successful decode is increased by the fact that a 1D symbol of unknown size may be decoded from two different sets of image data, having different respective resolutions, which are scanned and decoded independently of one another.

In the commercial embodiment of the apparatus of the invention, the aiming light ordinarily included in the flood illuminated scanning assembly is omitted entirely and the space formerly occupied by that aiming light is occupied by the optical illumination or output port of the laser scanning assembly. Since this port occupies a relatively small fraction of the frontal area of the laser scanning assembly, it is possible to so position the laser scanning assembly in relation to the optical read or input port of the flood illuminated scanning assembly that the read ports of the two scanning assemblies are in proximity to one another and at least roughly equidistant from the symbol to be read. This, in turn, assures that the two scanning assemblies have virtually the same vantage point with respect to the symbol to be read. Particularly when the flood illuminated scanning assembly is of the low profile type described in copending commonly assigned patent application Ser. No. 08/649,126 which is hereby incorporated herein by reference, this positioning of the laser scanning assembly allows the two scanning assemblies to together occupy a total volume that is not appreciably greater than that occupied by previously known readers which include only a flood illuminated scanning assembly.

The preferred embodiment of the invention also contemplates that the laser scanning assembly be of the type that has a controllably actuatable aiming mode or feature. The actuation of this mode may, for example, cause the laser beam to illuminate the target region with an aiming illumination pattern that is recognizably different from the illumination pattern used during scanning. With the addition of suitable diffractive optic elements, the aiming illumination pattern may take the form of a pattern of spots which bracket the target symbol in two dimensions. In the commercial embodiment of the invention this laser scanning assembly is able to serve as an aiming pattern generator for both of the two scanning assemblies, thereby saving the cost of one aiming pattern generator.

In its method aspect, the present invention contemplates the use of the above-discussed scanning and decoding assemblies in new relationships to achieve new and/or improved results. When, for example, the decoding steps associated with the two scanning assemblies bear a sequential relationship to one another, the invention affords two different independent opportunities to decode 1D symbols using image data scanned with different respective resolutions. This, in turn, allows readers which practice the method of the invention to read optically encoded 1D symbols having a wider range of data densities than otherwise comparable 2D readers.

When the method of the invention includes the step of discontinuing scanning and decoding as soon as there is a successful decode, the total time necessary to scan and decode a symbol of unknown size and density may be significantly shortened. When, on the other hand, the method of the invention includes the step of not discontinuing scanning and decoding when there is a successful decode, two independent scanning and decoding events may be compared to determine if they result in the same decoded data, an outcome that allows data to be double checked for accuracy and reliability.

In accordance with another feature of the present invention, operation in the desired ones of the above-described modes is preferably made user selectable by means of a table of machine readable menu symbols. Also available as menu selectable modes of operation are the disablement of one of the two scanning and decoding assemblies, a feature which allows the reader to operate as a conventional 1D or 2D reader when such operation is desired.

In accordance with still another feature of the invention, operation in any of the above-discussed modes is compatible with the use of all types of reader triggering. In those embodiments in which both scanning assemblies are aimed by means of the same aiming pattern generator, the steps necessary to control triggering are no more complex than those used to individually control each scanning assembly. Thus, readers which practice the present invention may be used in both manually triggered and auto-triggered applications.

DESCRIPTION OF THE DRAWINGS

Other objects and advantages of the invention will be apparent from the following description and drawings, in which:

FIG. 1A shows a target T together with the illumination patterns established by the reader of FIG. 1;

DESCRIPTION OF THE PREFERRED EMBODIMENTS

Figure 1:
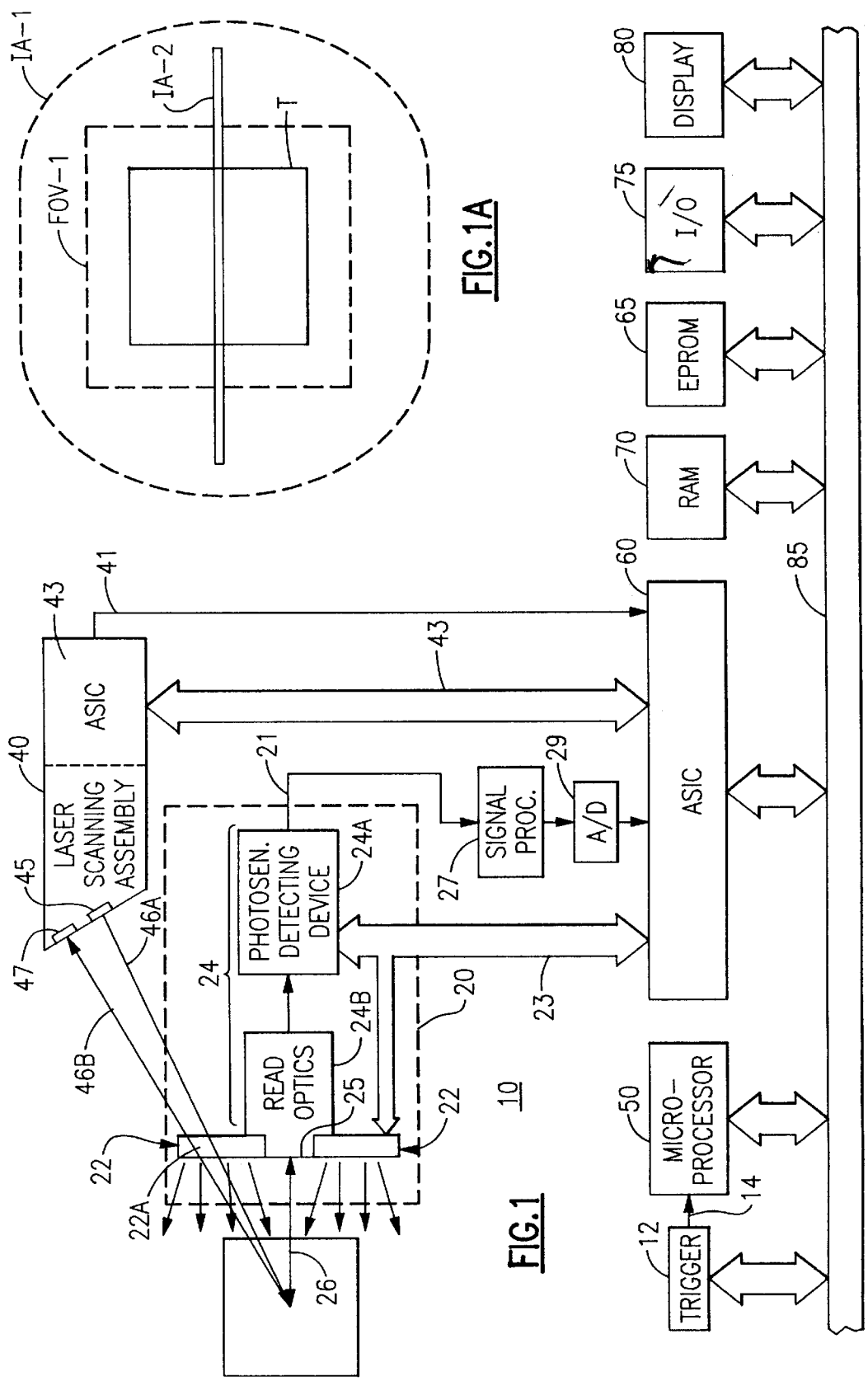
FIG. 1 is a block diagram of one embodiment of a reader constructed in accordance with the present invention.

Referring to FIG. 1 there is shown a block diagram of an optical reader 10 suitable for use in practicing the method and apparatus of the present invention. Reader 10 includes first and second scanning assemblies 20 and 40 which are each adapted to scan image data that is optically encoded in a target symbol T, such as a 1D or 2D bar code symbol. In the embodiment of FIG. 1 first scanning assembly 20 comprises a scanning assembly which is adapted to two dimensionally flood illuminate an area that surrounds target T, read the light reflected from target T and generate at an output 21 thereof a signal that contains image data from target T. A scanning assembly which is suitable for use as scanning assembly 20 is shown and described in previously mentioned U.S. patent application Ser. No. 08/649,126.

Similarly, second scanning assembly 40 comprises a 1D laser scanning assembly which is adapted to project a 1D scan line that passes through target T, read light reflected from target T, and generate at an output 41 thereof a signal that contains image data from target T. A scanning engine which is suitable for use as scanning assembly 40 is shown and described in "SE-1000 Family Integration Manual", Revision D, published by Symbol Technologies, Inc. in November 1994, which is also incorporated herein by reference.

Because FIG. 1 is an electrical block diagram, assemblies 20 and 40 are not shown in their true relative sizes and positions therein. The true relative sizes and positions of these assemblies may be seen in FIGS. 2 and 3.

Optical reader 10 also includes control and data processing circuitry which serves to control and coordinate the scanning activities of scanning assemblies 20 and 40 and to decode the image data generated thereby. In the embodiment of FIG. 1 this control and data processing circuitry includes a first, general purpose programmable processing device 50 which may take the form of an integrated circuit microprocessor, and a second, special purpose programmable processing device 60 which may take the form of an application specific integrated circuit (ASIC). These processing devices operate cooperatively, under the control of a stored program stored in a suitable erasable read only memory (EPROM) 65, to controllably enable assemblies 20 and 40 and to store the image data generated thereby in a suitable random access read-write image data memory (RAM) 70. Microprocessor 50 then preferably operates under the control of a selectable one of a plurality of suitable decoding programs stored in EPROM 65 to decode the image data stored in RAM 70 and output the resulting data via a suitable I/O device 75 or display 80. To the end that this may be accomplished, processors 50 and 60, memories 65 and 70 and I/O and display devices 75 and 80 are all connected together via a suitable multi-conductor bus 85 which may be of conventional design.

The scanning-decoding activity of reader 10 will ordinarily be initiated or triggered in one of two ways. The first of these ways, known as "manual triggering", makes use of a manually actuated trigger 12 which may be coupled to processor 50 or 60 indirectly through bus 85 and a suitable I/O interface (not shown), or directly through one or more dedicated input lines together indicated by the designation 14. The second of these ways, known as "auto-triggering", does not require the actuation of a trigger, and instead relies upon the appearance, within the field of view of the reader, of more than a predetermined quantity of decodable data. Many readers provide for both manual and auto-triggering and allow a user to select which of these will be used. Because manual and auto-triggering are well known to those skilled in the art, these triggering methods will not be described in detail herein.

In accordance with one important feature of the present invention, scanning assemblies 20 and 40 are disposed in an electrically parallel relationship to the remaining circuitry of reader 10. More particularly, ASIC 60 is connected in control relationship to scanning assemblies 20 and 40 via parallelly disposed sets of control lines 23 and 43, respectively. Similarly, scanning assemblies 20 and 40 are connected in data supplying relationship to the decoding circuitry of reader 10 (preferably via ASIC 60) via parallelly disposed data output lines (or sets of lines) 21 and 41, respectively. Data signals from scanning assembly 20 may be applied to ASIC 60 via signal processing and analog to digital (A/D) circuits 27 and 29. Corresponding separate processing and converter circuits for scanning assembly 40 are unnecessary, if assembly 40 is an SE-1000 scanning engine, since the latter has built-in signal processing and digitizing circuits. In accordance with the invention, these parallel relationships allow reader 10 to actuate and use scanning assemblies 20 and 40 alternatively, at any desired times, and in any desired sequence, as called for by the stored program of the reader.

In the preferred embodiment, ASIC 60 comprises an integrated circuit, such as a programmable logic array (PLA), which includes all of the ASIC circuitry necessary to select, control and read data from scanning assembly 20. ASIC 60 may also include all of the circuitry necessary to select and control laser scanning assembly 40. If laser scanning assembly 40 is the previously mentioned SE-1000 scanning engine, it will include a built-in ASIC of its own. As a result, the portion of ASIC 60 that is associated with the control of assembly 40 will be much simpler than that associated with the control of assembly 20. This allocation of the resources of ASIC 60 is not, however, of significance for purposes of the present invention. As a result, the ASIC circuitry for scanning assemblies 20 and 40 may be distributed among two or more separate circuit packages or integrated into a single circuit package depending upon the particular application. Accordingly, the term "ASIC processor" as used herein will be understood to apply generally and globally without regard to the number or location of circuit packages used to perform its function.

Processors 50 and 60 are together responsible for the selection between and control of scanning assemblies 20 and 40, and for the decoding of image data generated thereby. These tasks may, however, be divided between processors 50 and 60 in any manner that is consistent with their individual capabilities. In most applications this division of labor is such that processor 60 is primarily devoted to the task of controlling scanning assemblies 20 and 40 and storing the resulting image data within RAM 70 via a suitable DMA controller or channel (not shown), while processor 50 is primarily devoted to the task of decoding stored image data and controlling the operation of the reader as a whole, and its communications with a host processor (not shown) via I/O 75. It will therefore be understood that reference to decoding structures or decoding steps actually refer to features or functions that are performed by more than one of the blocks shown in FIG. 1 or its host processor, together with appropriate parts of the stored program of reader 10.

Figure 2:
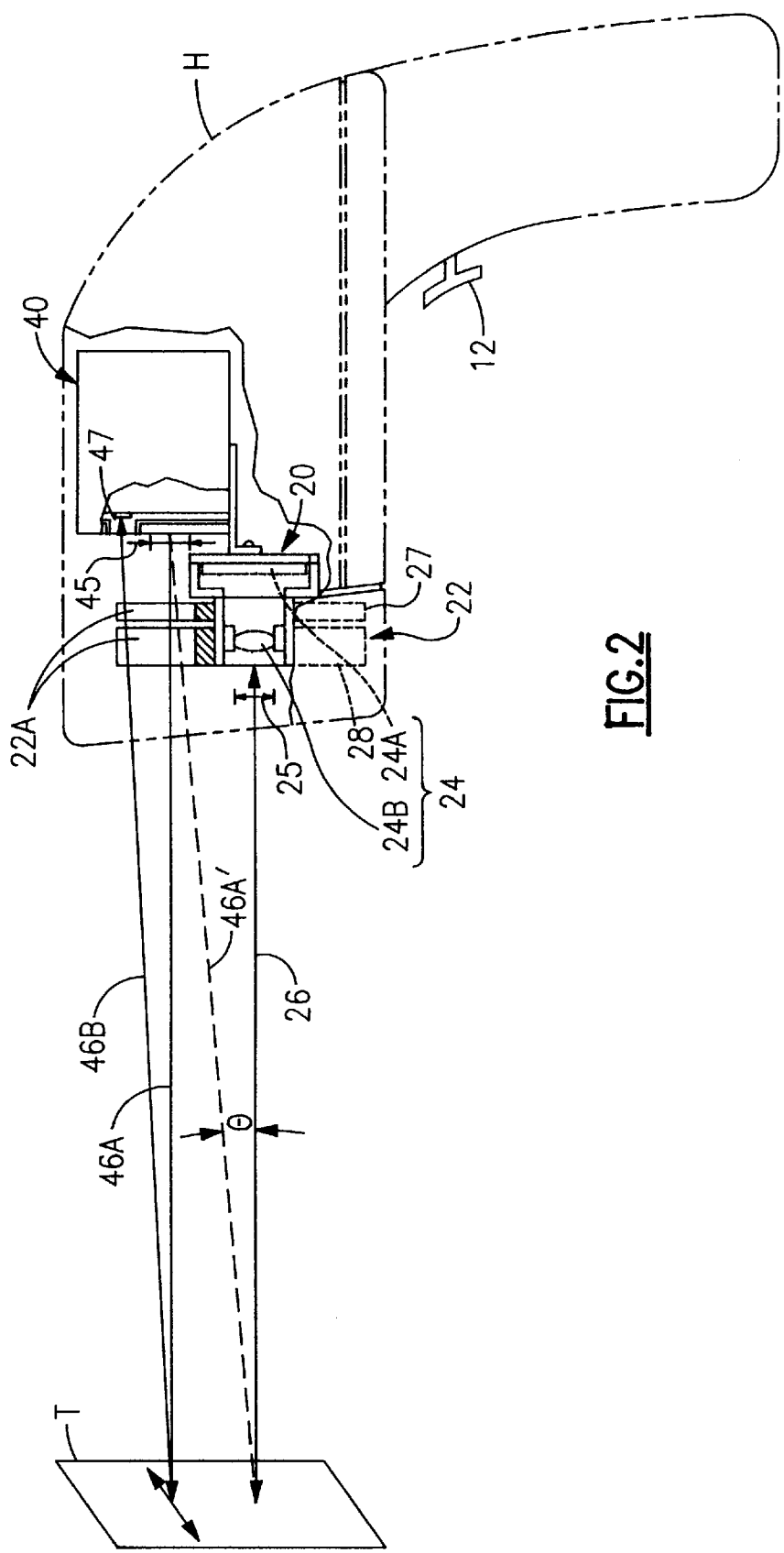
FIG. 2 is a partially cutaway side view of the reader of FIG. 1 showing the two scanning assemblies thereof together with their optical axes.

In accordance with another feature of the present invention, scanning assemblies 20 and 40 are disposed in physical proximity to one another as, for example, by locating them one above the other, as shown in FIG. 2. This assures that the two scanning assemblies together occupy a space within the housing H of the reader that is not significantly greater than the space occupied by only one thereof. This, in turn, assures that the inclusion of both scanning assemblies in a hand held reader does not impair the ability of the reader to be used as a hand held reader.

Figure 3:
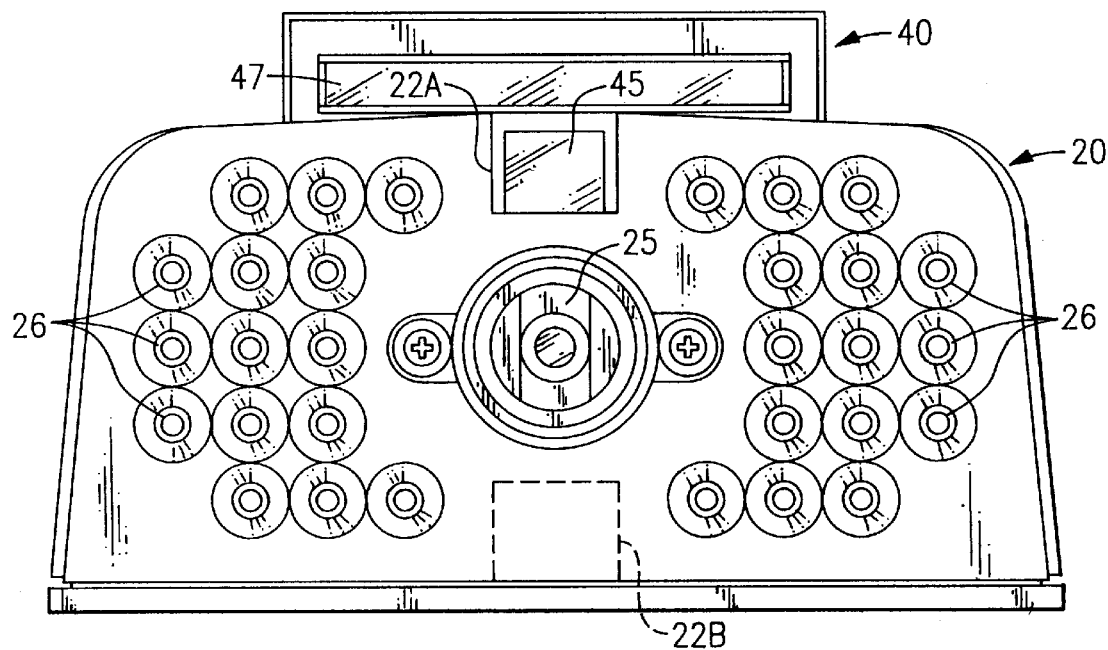
FIG. 3 is an enlarged fragmentary front view of the scanning assemblies of the reader of FIG. 1.

Scanning assemblies 20 and 40 are also disposed in optical proximity to one another, a term which is used herein to refer to the fact that the two scanning assemblies have an orientation and a spacing such that they have approximately the same vantage point with respect to target T. In part, this optical proximity refers to the optical read ports or windows 25 and 47 through which light reflected from target T are received by scanning assemblies 20 and 40 and directed against the photosensitive detectors thereof, as shown in FIGS. 2 and 3. It also refers, however, to the proximity of the illuminating sources or assemblies which illuminate the target while it is being read. For purposes of the present invention, the desired proximity is achieved when both scanning assemblies are able to illuminate and read a target symbol, over substantial and overlapping ranges of reader-to-target distances, without moving the reader during a read operation. Stated differently, if the illumination patterns and depths of field of the scanning assemblies overlap one another at least in part over at least a substantial portion of the depth of field of one of the scanning assemblies, the two scanning assemblies may be said to be in optical proximity to one another.

The manner in which the above-mentioned physical and optical proximity of the scanning assemblies is achieved is most easily understood with reference to FIGS. 2 and 3. As shown in FIG. 2, which comprise a partly cutaway side view of one embodiment of the reader of the invention, first scanning assembly 20 includes an illuminating subassembly 22 which is adapted to provide 2D or flood illumination to an illuminated area 1A-1, best shown in FIG. 1A, that encompasses target T. (In FIG. 1A, the boundary of area 1A-2 is shown as being very much more sharp than it appears in practice.) This flood illumination is preferably produced by a 2D array of LEDs 26 that are disposed on a substrate 27 that is generally perpendicular to the optical axis 26 of the reader, and by reflective light director assembly 28 which is positioned thereover to direct light from the LEDs into illuminated area 1A-1. First scanning assembly 20 also includes an imaging subassembly 24 which is adapted to receive light reflected from illuminated area 1A-1 through an optical port 25 and generate therefrom a signal that includes data encoded in target T. Imaging subassembly 24 preferably includes a suitable 2D image sensor 24A, such as a CCD array, and a read optics subassembly 24B which is adapted to focus on image sensor 24A an image of that portion of illuminated area 1A-1 which is within the field of view of read optics subassembly 24B. That portion of this illuminated area which is actually imaged by image sensor 24A comprise the field of view of the first scanning assembly and is designated FOV-1 in FIG. 1A.

Because, except as will be noted later in connection with aiming, the structural particulars of scanning subassembly 20 are shown and described in detail in earlier mentioned application Ser. No. 08/649,126, which has been incorporated herein by reference, these particulars will not be further described herein. The feature of scanning assembly 20 that is most of interest for purposes of the present invention is that it has a low profile. In other words, scanning assembly 20 has relatively small dimensions in directions parallel to the optical axis 26 of assembly 20. (In the case of scanning assembly 20, the centering of read port 25 among the LEDs of the illuminating assembly, as shown in FIG. 3, causes the optical axis of the read optics to coincide with the optical axis of the illumination assembly.) This low profile is significant because it assures that assembly 20 occupies only the front portion of the housing H of reader 10 and thereby defines, within housing H, an interior space that is large enough to receive a second scanning assembly without causing reader 10 to become so large as to be inconvenient to use as a hand held article.

Figure 4:
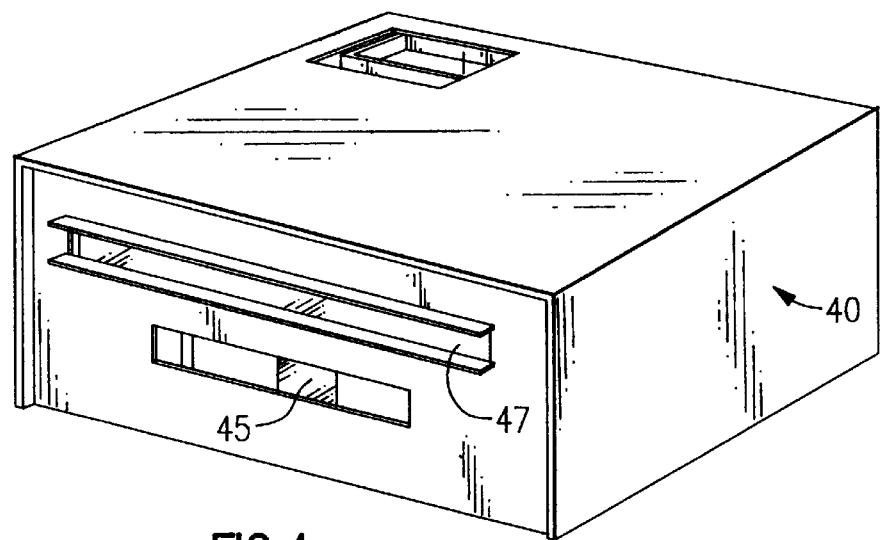
FIG. 4 is an enlarged oblique view of the laser scanning assembly of FIG. 1.

The reader of FIG. 2 also includes a second scanning assembly 40; an oblique view of assembly 40 as a detached, stand alone unit is shown in FIG. 4. Scanning assembly 40 is preferably of the laser scanning type, and may comprise a laser scanning engine of the kind sold by Symbol Technologies, Inc. under the model designation SE-1000. Such a scanning assembly has a 1D illumination subassembly including a laser beam that is linearly scanned across an illuminated area (see illuminated area 1A-2 of FIG. 1A) through an optical illumination port 45 by means of a rotatable scan mirror (not shown). It also has an imaging subassembly, including a photosensitive detector (not shown) which generates from light reflected back from the target symbol through a read port 47 a signal indicative of the data encoded in a 1D slice of that symbol. Because laser scanning modules of the subject type, and the control signals necessary to operate them, are known to those skilled in the art, the particulars of the structure and operation of such modules will not be described in detail herein.

In accordance with one feature of the present invention, the illuminating and imaging parameters of scanning assemblies 20 and 40 are chosen so that, over at least a relatively large range of reader-to-target distances, scanning assemblies 20 and 40 may be used interchangeably without moving the reader with respect to its target. Since laser (1D) scanning assembly 40 has a relatively greater depth of field than flood illuminated (2D) scanning assembly 20, the depth of field capability of the 2D scanning assembly will ordinarily be a limiting factor in setting the boundaries of the region of overlap or interchangeability for the reader as a whole. This should not be understood to mean that the reader will produce decodable data only if the target is located in the region of overlap of the two scanning assemblies; it does mean, however, that inside or outside of the region of overlap, only one of the scanning assemblies may be able to produce decodable image data. Thus, the location of the two scanning assemblies in proximity to one another does not prevent either scanning assembly from being used on an individual, stand alone basis.

The ability of scanning assemblies 20 and 40 to be used interchangeably over at least some common range of reader-to-target distances is optimized by causing their illumination axes 26 and 46A and their read axes 26 and 46B to have as nearly as possible the same vantage point with respect to the target. This is preferably achieved by locating scanning assemblies 20 and 40 so that their illumination and read axes are offset from one another by the smallest possible distance and are at least roughly parallel to one another, as shown in FIG. 2. This is because, to the extent that the illumination axes 26 and 46A of the scanning assemblies are displaced or offset from one another, the geometrical center of the target cannot be illuminated by both scanning assemblies simultaneously. This is also because, to the extent that the read axes 26 and 46B and the read ports 25 and 47 of the scanning assemblies are displaced from one another, they will have different read vantage points of target T. Some degree of such offset is tolerable, particularly in the case of 1D symbols, since 1D symbols need not be scanned by scan lines that coincide with their centerlines. Some degree of offset is also tolerable with 2D symbols, since 2D symbols are not ordinarily readable by a 1D laser scanners in any case. Thus, the optical axes of the two scanning assemblies need not be coincident or even parallel with one another: proximity and rough parallelness is sufficient for most applications.

To the end that the optical axes and read ports of scanning assemblies 20 and 40 may be in the desired proximity to one another, flood illuminating subassembly 22 may be provided with an opening or notch 22A through which laser scanning assembly 40 may illuminate target T. Advantageously, this opening may be created by leaving out the aiming light included in the reader shown in application Ser. No. 08/649, 126 and using the space thus released to define opening 22A. This is readily accomplished since the illumination port or window 45 of laser scanning assembly occupies a relative small fraction of the front portion of scanning assembly 40. This allows scanning assembly 40 to be disposed immediately behind scanning assembly 20 and to illuminate target T, through opening 22A, with the illumination axes 26 and 46A of assemblies 20 and 40 in proximity to one another. This positioning also allows read port 47 of scanning assembly 40 to "look over" assembly 24 and read data from target T with read axes 26 and 46B of assemblies 20 and 40 in proximity to one another. Together these relationships allow at least a large fraction of assembly 40 to occupy the interior empty space behind assembly 20, thereby assuring that housing H is kept to a manageable size.

In one embodiment of the invention, the above-described relationship of proximity may be realized with the optical axes 26 and 46 of scanning assemblies 20 and 40 aligned in parallel with one another, as shown in FIG. 2. This embodiment of the invention has the advantage that all except very small target symbols can readily be imaged by the imaging subassemblies of both scanning assemblies.

In another embodiment of the invention, the above described relationship of proximity may be realized by making the optical axes of scanning assemblies 20 and 40 converge with one another as, for example, by mounting assembly 40 so that its optical axes has a predetermined downward tilt with respect to the optical axis of assembly 20. In FIG. 2 the downwardly tilted axis of scanning assembly 40 is shown in dotted lines as optical axis 46A', and the angle of convergence between the axes is labeled ⊖. This embodiment has the advantage that, at least over the region in which the laser scan line of assembly 40 is in proximity to the centroid of the area illuminated by assembly 20, even relatively small target symbols can be imaged by both imaging subassemblies.

As explained earlier, one of the principal objects of the method and apparatus of the invention is to scan and decode a wide range of symbols having different illumination and resolution requirements, without moving the reader, by including two different scanning assemblies with differing resolution capabilities and overlapping illumination patterns and depths of field in physical and optical proximity with one another. A second of the principal objects of the invention is to so coordinate the operation of the two scanning assemblies that they may be used interchangeably as necessary to accomplish the desired decoding, without requiring the user of the reader to change its operational mode or settings. A third of the principal objects of the invention is to accomplish the first and second objects in a manner that is compatible with commonly used reader triggering and menuing techniques. The manner in which these objectives are accomplished will now be described with reference to the flow charts of FIGS. 5 through 9.

Figure 5:
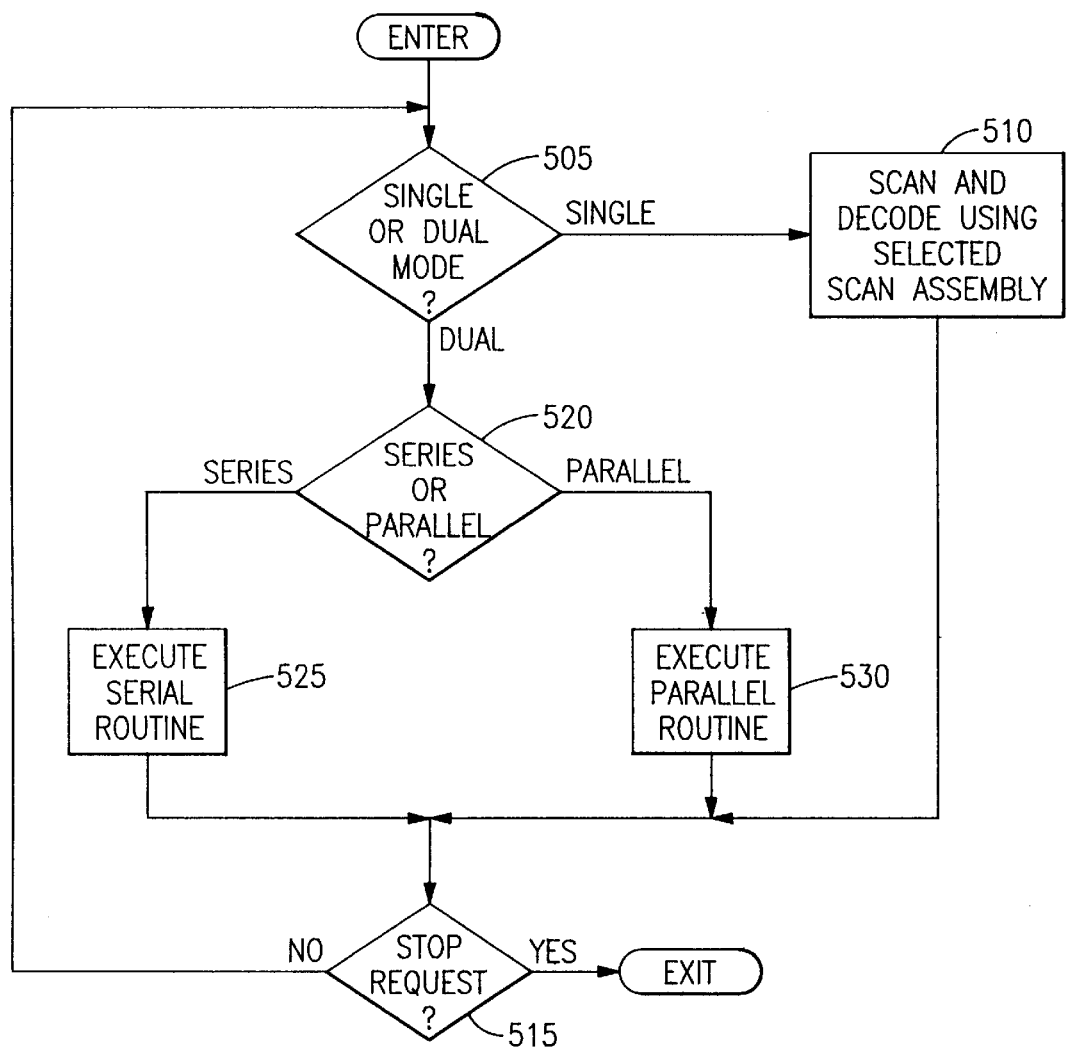
FIGS. 5 through 9 are flow charts which illustrate the operation of the method and apparatus of the invention.

Referring to FIG. 5, there is shown a high level flow chart that illustrates the main modes in which a reader constructed in accordance with the invention may be used. The first of these modes, which may be termed a scan mode, is related to whether one or both scanning assemblies will be activated during each scanning-decoding cycle, a term which will often herein be abbreviated to read cycle. In a single scan mode, one and only one of the scanning assemblies will be activated during a read cycle. The single scan mode is useful when the types, densities and distances of the symbols to be read are such that they are known to be readable by one of the scanning assemblies, but only potentially readable by the other. In a dual scan mode, both scanning assemblies will ordinarily be actuated during a read cycle. The dual scan mode is useful when the types or distances of the symbols to be read are not known in advance. Selection between these modes may be made as a manual or menu selectable basis between read cycles and is represented in FIG. 5 by a decision block 505.

If the single scan mode is selected per block 505, the reader is directed to block 510, which causes it to scan and decode, using the selected one of the scan assemblies, until requested to stop by block 515. The latter block may represent the release of manual trigger 12 or the completion of a program defined condition such as a successful decode, a timeout, etc.

If the dual scan mode is selected per block 505, the reader is directed to block 520, which causes it to determine which of the available dual scan modes is wanted. In the preferred embodiment, these modes include at least what are referred to herein as "serial" and "parallel" modes. In the serial or sequential mode, an attempt is made to complete a read cycle using one scan assembly before an attempt is made to complete a read cycle using the other scan assembly. (Which scan assembly is used first is arbitrary and may be made user selectable as alternative sub-modes.) This mode is represented in FIG. 5 by block 525 and is shown in greater detail in the flow chart of FIG. 6. Operation in this mode has the advantage of discontinuing reading activity as soon as a successful decode occurs, thereby increasing overall data throughput by skipping unnecessary read cycles.

In the parallel or simultaneous mode, both scan assemblies are used to acquire respective sets of image data, and an attempt is made to decode these sets of image data substantially simultaneously as, for example, on a time division multiplexed basis. (Whether or not decoding activity is terminated when the first to be decoded set of image data is successfully decoded may be made user selectable as alternative sub-modes.) This mode is represented in FIG. 5 by block 530 and is shown in greater detail in the flow chart of FIG. 7. Operation in this mode makes possible the comparison of results of two read cycles as a check for decoding accuracy.

Figure 6:
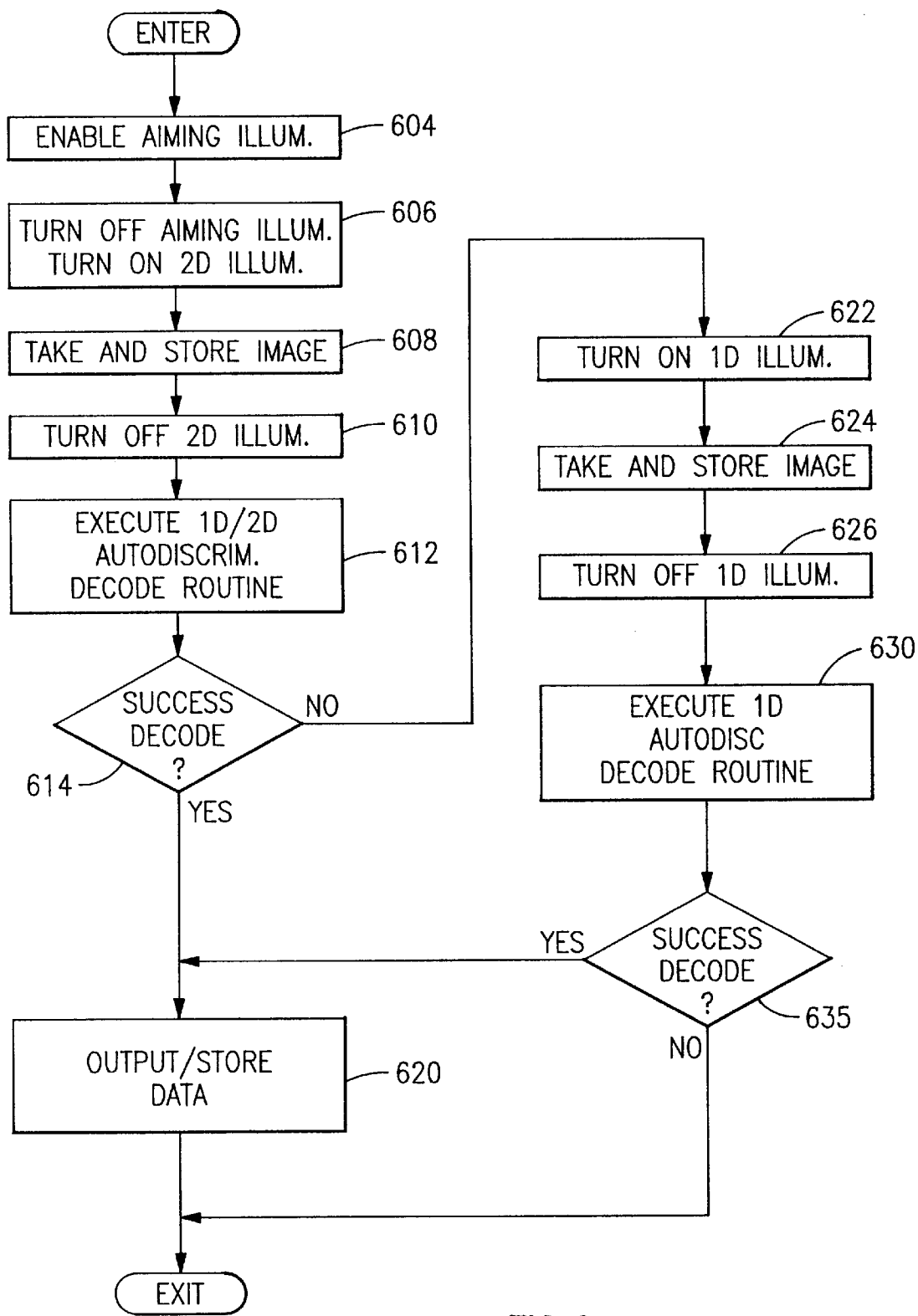

Referring to FIG. 6 there is shown in greater detail one embodiment of the serial/sequential variant of the dual scan mode of operation of reader 10 which was mentioned in connection with block 525 of FIG. 5. In the embodiment of FIG. 6, 2D scanning assembly 20 is activated before 1D scanning assembly 40, although this order could be reversed, if desired. In addition, scanning assembly 40 is activated if and only if no successful decode results from the activation of scanning assembly 20, although this conditionality may be eliminated, if desired.

Figure 8:
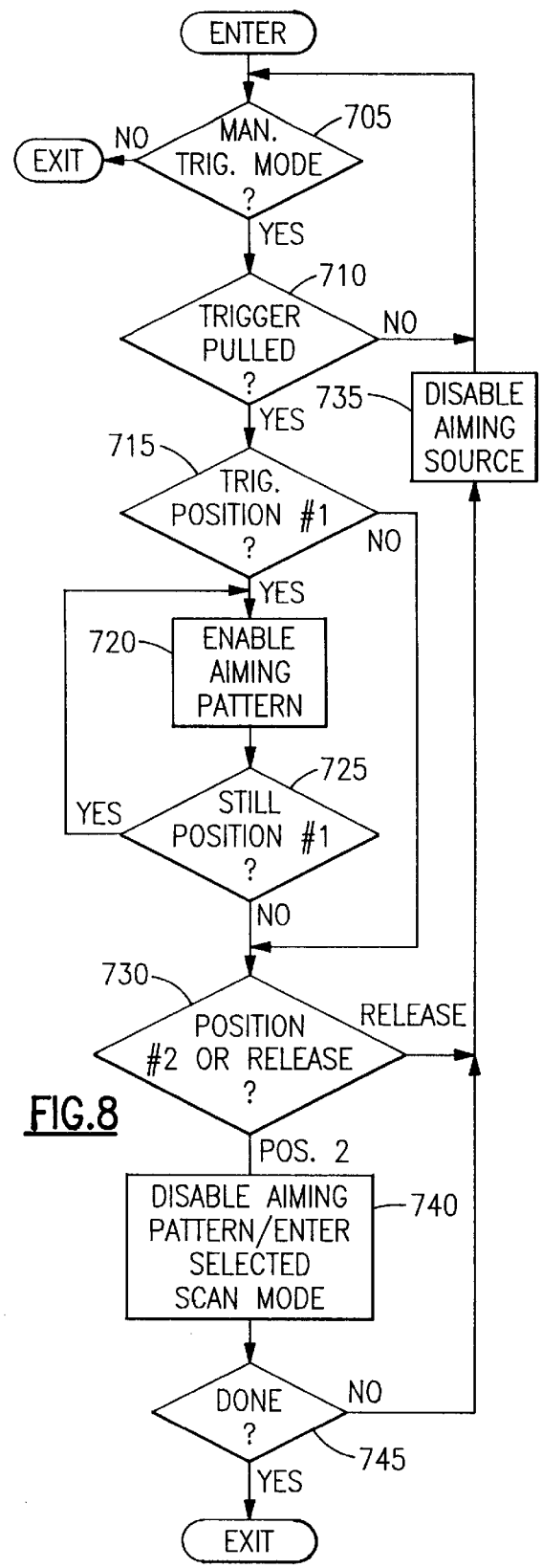
Figure 9:
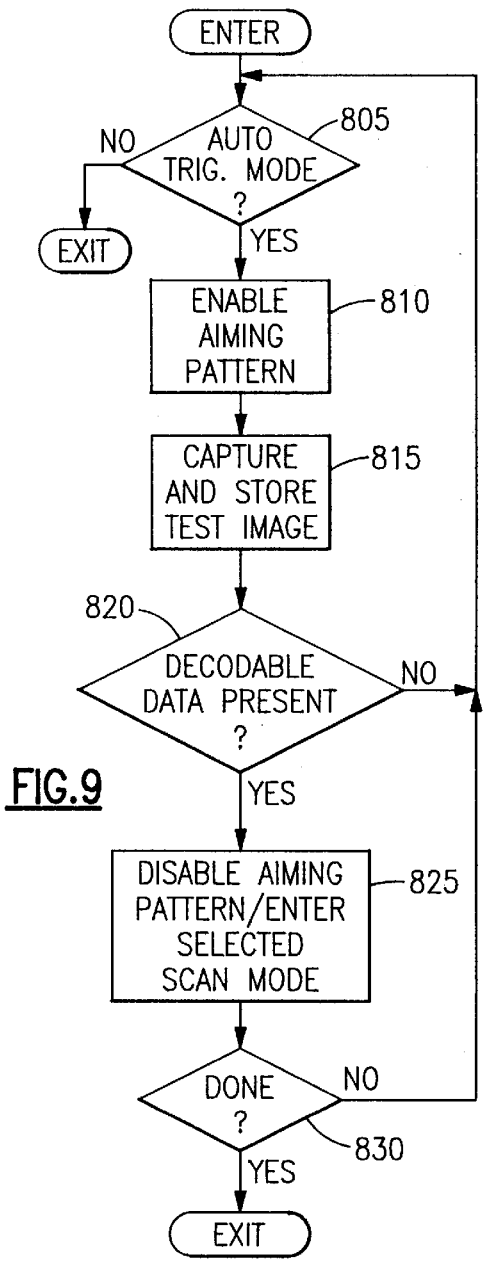

As operation in accordance with the program of FIG. 6 begins, the aiming illumination generator is turned on, as called for by block 604, to help the user to aim the reader at the target. This generator may be turned on (and off) by a suitable manually actuated multi-position trigger, as shown in FIG. 8, or may be turned on by a manually actuated trigger and turned off automatically after a suitable preset time. This generator may also be turned on in an auto trigger mode, as shown in FIG. 9. Once this has been done, control passes to block 606 which turns off the aiming illumination generator and turns on the 2D (flood) illumination assembly, and then to block 608 which causes the reader to take and store a 2D image of the target in RAM 70. Thereafter, block 610 causes the reader to turn off the 2D illumination and proceed to block 612. The latter block causes the decoding assembly of reader 10 to attempt to decode the stored image data in accordance with a 1D/2D autodiscrimination program stored in EPROM 65. This autodiscrimination program enables the decoding assembly to decode both 1D and 2D symbols of unknown type, provided that they can be imaged with sufficient resolution by 2D scanning assembly 20. One desirable type of 1D/2D autodiscrimination program is disclosed in U.S. patent application Ser. No. 08/697,921 which is owned by the assignee of the present application and which is hereby incorporated herein by reference. Because 1D/2D autodiscrimination programs are known to those skilled in the art, the particulars of this program will not be discussed in detail herein.

After the 1D/2D decoding process is completed, control passes to decision block 614, the presence of which is optional. If the latter is present and decoding has been successful, control passes to block 620, which causes the processor to output the decoded data (or store this data for output at a later time) and then exit the routine of FIG. 6.

If block 614 is present and 1D/2D decoding is unsuccessful, control passes to blocks 622 and 624 which causes the 1D scanning assembly 40 to turn on the 1D illumination source and sweep an 1D scan line across the target while taking and storing the result in RAM 70. Once this has been done the 1D illumination is turned off, as called for by block 626, and control passes to block 630. The latter block causes the decoding assembly of reader 10 to attempt to decode the stored image data in accordance with a 1D autodiscrimination program stored in EPROM 65. The latter enables the decoding assembly to decode any of a plurality of types of 1D symbols of unknown type, provided that they can be imaged with sufficient resolution by 1D scanning assembly 40. Since 1D autodiscrimination programs are familiar to those skilled in the art, this program will not be discussed in detail herein.

After the 1D decoding process is completed, control passes to decision block 635. If decoding has been successful, control passes to previously mentioned block 620, which causes the processor to output or store decoded data and then exit FIG. 6 or to exit FIG. 6 without outputting data.

In view of the foregoing, it will be seen that reader 10 will make decoded output data available to a user (a) if target T is a 1D or 2D symbol of unknown type which is within the illumination, depth of field and resolution capability of scanning assembly 20, and/or (b) if target T is a 1D symbol of unknown type which is within the illumination, depth of field and resolution capability of scanning assembly 40. It will also be, seen that this result occurs automatically, without the movement of the reader and without any manual change in reader modes or settings. Thus, a reader constructed or operating in accordance with the invention has a high probability of producing a successful decode over a wide variety of sizes, densities and distances of symbols with a minimum of user involvement.

Figure 7:
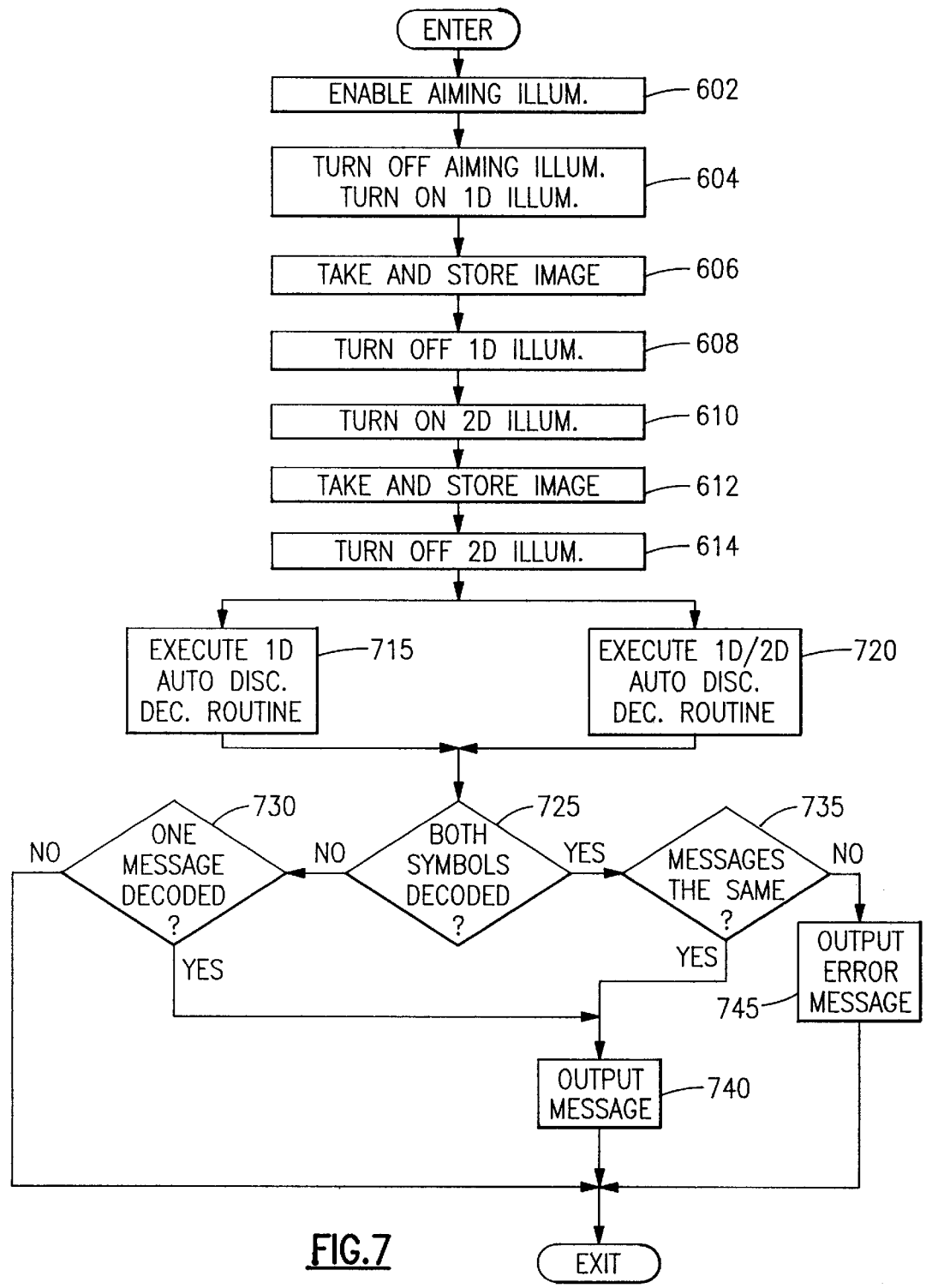

Referring to FIG. 7, there is shown in greater detail one embodiment of the parallel/simultaneous variant of the dual scan mode of operation 10 which was mentioned in connection with block 530 of FIG. 5. In the embodiment of FIG. 7, 2D scanning assembly 20 and 1D scanning assembly 40 are both activated to illuminate, scan and store respective sets of image data before the decoding phase of the read cycle is begun. This may, for example, be accomplished by performing the 1D illumination and imaging operations (blocks 604–608) and the 2D illumination and imaging operations (blocks 610–614) one after the other, as shown. There is no reason in principle, however, why these illumination and imaging operations cannot be performed simultaneously, provided that the illumination patterns established by the scanning assemblies are or can be made to not interfere with one another as, for example, by being at different optical wavelengths.

Once the two sets of image data are stored, the decoding phase of the read cycle begins. In the embodiment of FIG. 7, the decoding phases for the two sets of image data proceed substantially simultaneously, as suggested by the parallel connections of decoding blocks 715 and 720. Time division multiplexing of the decoding steps may be used for this purpose, if desired. Once the attempted decoding of both sets of image data has been completed, blocks 725 through 745 may be used to impose various sets of conditions on the outputting and use of the resulting data. Blocks 725, 735 and 740 can be used to output a decoded message only if decoding steps 715 and 720 produce sets of decoded data that match, with an error message being output per block 745 if there is a mismatch. If desired, there may be included a block 730 which can be used to output a decoded message if one and only one of the sets of decoding steps results in a successful decode. Because the operation of these blocks will be apparent to those skilled in the art, they will not be discussed in detail herein.

In view of the foregoing, it will be seen that the dual scan mode embodiment of FIG. 7 produces a result which is generally similar to that of FIG. 6 in that symbols having different types, sizes, resolutions and distances may be accommodated without requiring the involvement of the user. Thus, the embodiments of FIGS. 6 and 7 are equivalent to one another for purposes of the present invention.

The dual scan mode embodiments of FIGS. 6 and 7 will be understood to be only two representative examples of methods for controlling and coordinating the operation of the multiple scanning and decoding assemblies of the present invention. Additional condition steps or skipping steps may be included as required to speed up or otherwise optimize the cooperative activities of these assemblies for particular applications. It will be understood that all such methods are within the contemplation of the present invention.

In accordance with another important feature of the invention, the above-described advantages are provided in a reader in which a single aiming illumination pattern generator is used to generate an aiming illumination pattern for both scanning assemblies. One reason that a single aiming pattern generator may be used is that the optical axes of scanning assemblies 20 and 40 are in proximity and at least roughly in parallel with one another. Another is that because laser scanning assemblies, such as the Symbol Technologies SE-1000 scan engine, have an aiming feature or mode that may be activated without activating a read cycle. In the SE-1000 scan engine this aiming feature comprises the generation of a scan having a "collapsed" or aim amplitude, which is recognizably different from the "normal" or read scan amplitude. The aim scan amplitude is selected via the AIM input thereof of the engine. With the present invention the aim scan amplitude (or state) is selected when either scanning assembly is to be aimed, without reference to which assembly will be used to illuminate and read the target. The usability of the laser aiming beam of 1D scanning assembly 40 as an aiming illumination pattern for 2D scanning assembly 20 is illustrated in FIG. 1A. In the latter figure it will be seen that laser illuminated area 1A-2 is close enough to the center of field of view FOV-1 of image sensor 24A that it may be used to assure that target T falls within that field of view.

Optionally, if a two dimensional aiming illumination pattern is wanted, suitable diffractive optics elements may be positioned to intercept the outer ends portions of the laser scan beam and convert the light from those outer and portions into a pattern of spots that frame field of view FOV-1. The use of diffractive optics elements in this way is described in provisional U.S. patent application Ser. No. 60/031,054, filed Nov. 18, 1996, and in subsequently filed U.S. patent application Ser. No. 08/936,320, filed Sep. 24, 1997, which is hereby incorporated herein by reference. If such an aiming pattern generator is used, it may be located behind a further opening 228 through flood illuminating assembly 20, as shown in dotted lines in FIG. 3.

Referring to FIG. 8, there is shown a flow chart which illustrates how the scanning and decoding steps described in connection with FIGS. 6 and 7 may be implemented in conjunction with a manually actuated trigger. In the embodiment of FIG. 8 this manually actuated trigger has two active or on states in addition to an inactive or off state. The first on state is preferably associated with the generation of an aiming illumination pattern and the second on state is associated with the generation of a read illumination pattern.

On entering the flow chart of FIG. 8, the processor first encounters block 705 which causes it to determine if the parameter table of the reader calls for operation in the manual triggering mode and, if not, immediately exits. If manual triggering is called for, the processor continues in a wait loop including decision block 710 until the pulling of the trigger indicates that further action is called for. If the trigger is pulled to position 1, the processor is directed to blocks 715 through 725 which cause it to actuate the aiming illumination pattern and maintain that pattern until the trigger leaves position 1. If the trigger is then released from position 1, the aiming pattern is turned off via blocks 730 and 735 and the reader is returned to its wait state. If, however, the trigger is moved from position 1 to position 2, the reader is directed via block 740 to turn off the aiming pattern and perform the desired one of the dual scan mode scanning and decoding routines, e.g., FIG. 6 or FIG. 7. Once this has been done, the reader is returned to its' wait state or caused to exit, depending upon the state of "Done" block 745, which may be defined in terms of any suitable user or program specified condition.

Referring to FIG. 9, there is shown a flow chart which illustrates how the scanning and decoding steps described in connection with FIGS. 6 and 7 may be implemented in a reader that uses auto-triggering. When this operating mode is selected as, for example by mode block 805, the reader enters a loop including blocks 810 through 820 which causes it to repeatedly test for the presence of more than a predetermined minimum amount of decodable image data. When block 820 determines that at least this minimum amount of data has been found, control block 825 which causes the reader to turn off the aiming pattern and perform the desired one of the dual mode scanning and decoding routines, e.g., FIG. 6 or 7. Once this has been done, the reader is returned to block 805 or caused to exit, depending on the state of "Done" block 830.

In view of the foregoing, it will be seen that the use of multiple scanning assemblies and their respective decoding assemblies is compatible with known manual and auto-triggering techniques. As a result, the method of operation of the invention may be practiced without requiring users who are familiar with these techniques to learn new ways of using their readers.

While the present invention has been described with reference to a number of specific embodiments, it will be understood that the true spirit and scope of the present invention should be determined with reference to the following claims.

What is claimed is:

1. In an optical reader for reading data optically encoded in a target symbol, said optical reader being of the type which has a read cycle that includes a scanning phase and a decoding phase, in combination:

a first, imaging scanning assembly for imaging said target symbol and generating a first set of image data;

a second, laser scanning assembly for scanning said target symbol and generating a second set of image data;

image storage means for storing image data generated by said first and second scanning assemblies;

decoding means for decoding image data stored in said image storage means; and control means for controlling the operation of said first and second scanning assemblies, said image storage means and said decoding means, said control means including a stored program that causes both of said scanning assemblies to scan said target symbol during the scanning phase of said read cycle, and that causes said decoding means to attempt to decode said first and second sets of image data, substantially simultaneously, during the decoding phase of said read cycle.

2. The apparatus of claim 1, further including output means for outputting data decoded by said decoding means, in which said output means outputs data decoded by said decoding means only when data resulting from the decoding of said first set of image data matches data resulting from the decoding of said second set of image data.

3. The optical reader of claim 1 in which said stored program includes a 1D autodiscrimination program, for use by said decoding means when it decodes image data generated by said second scanning assembly, and a 1D/2D autodiscrimination program, for use by said decoding means when it decodes image data generated by said first scanning assembly.

4. The optical reader of claim 3 in which said optical reader further includes mode selecting means for enabling a user to direct that a selectable one of said scanning assemblies be de-activated during later occurring read cycles, and that, during such later occurring read cycles, the decoding means attempt to decode only image data generated by the scanning assembly which is not de-activated.

5. The optical reader of claim 4 in which said mode selecting means includes one of a manually and a menu selectable means for directing said mode selecting means to deactivate a selectable one of said scanning assemblies.

6. The optical reader of claim 1 in which said optical reader further includes mode selecting means for enabling a user to direct that a selectable one of said scanning assemblies be de-activated during later occurring read cycles, and that, during such later occurring read cycles, the decoding means attempt to decode only image data generated by the scanning assembly which is not de-activated.

7. The optical reader of claim 6 in which said mode selecting means includes one of a manually and a menu selectable means for directing said mode selecting means to deactivate a selectable one of said scanning assemblies.

8. The apparatus of claim 1 in which said stored program causes said second scanning assembly to scan said target symbol while said first scanning assembly is imaging said target symbol.

9. The optical reader of claim 1 in which said first and second scanning assemblies have respective first and second depths of field, and in which said scanning assemblies are so located with respect to one another that said first and second depths of field overlap one another over at least a substantial fraction of the depth of field of one of said scanning assemblies.

10. The optical reader of claim 1 further including at least one aiming pattern generating means for generating at least one aiming illumination pattern for use in positioning said optical reader so that said target symbol can be read by both of said scanning assemblies.

* * * * *